United States Patent [19]

Hosono et al.

[11] Patent Number: 5,798,183

[45] Date of Patent: Aug. 25, 1998

[54] PACKAGING MATERIAL HAVING EXCELLENT FLAVOR RETENTION

[75] Inventors: Hiroko Hosono, Tokyo; Tetsuo Miyazawa, Ayase; Yoshitsugu Maruhashi, Yokohama; Katsuhiro Imazu, Yokohama; Yasuji Nakamura, Yokohama, all of Japan

[73] Assignee: Toyo Seikan Kaisha, Ltd., Tokyo, Japan

[21] Appl. No.: 507,835

[22] Filed: Jul. 27, 1995

[30] Foreign Application Priority Data

Jul. 27, 1994 [JP] Japan ..................... 6-175334

[51] Int. Cl.[6] ............. B32B 15/08; B32B 27/36; C08G 63/02
[52] U.S. Cl. ............. 428/458; 428/480; 428/469; 528/272; 528/275
[58] Field of Search ............. 428/458, 480, 428/461, 462, 471, 469; 528/272, 275

[56] References Cited

U.S. PATENT DOCUMENTS

| 4,278,718 | 7/1981 | Billings et al. | 428/64 |
| 4,533,576 | 8/1985 | Tanahashi et al. | 428/35 |
| 4,971,863 | 11/1990 | Hart | 428/458 |
| 5,262,513 | 11/1993 | Tanaka et al. | 528/272 |
| 5,384,354 | 1/1995 | Hasegawa et al. | 524/539 |
| 5,424,121 | 6/1995 | Murakami et al. | 428/337 |

FOREIGN PATENT DOCUMENTS 6116376A  4/1994  Japan.

OTHER PUBLICATIONS

Kirk–Othmer, Encyclopedia of Chemical Technology vol. 10, (No Month) 1980, pp. 450–451.
Guyton, A.C., Textbook of Medical Physiology, (No Month) 1991, W.B. Saunders Co., pp. 581–582.

Primary Examiner—John J. Zimmerman
Assistant Examiner—Michael LaVilla
Attorney, Agent, or Firm—Sughrue, Mion, Zinn, Macpeak & Seas, PLLC

[57] ABSTRACT

The present invention is a packaging material composed of a thermoplastic polyester as a constituent material. By adjusting the contents of a dibasic carboxylic acid and its oligomer derived from the polyester to 500 ppm or less, and adjusting sodium to 6 ppm or less and all alkali metals to 30 ppm or less, especially 20 ppm or less, the flavor retention of the packaging material can be markedly increased.

10 Claims, 2 Drawing Sheets

AMOUNT OF ALKALI METAL IN THE RESIN AND THE EVALUATION OF THE FLAVOR

AMOUNT OF OLIGOMER IN THE RESIN AND THE EVALUATION OF FLAVOR

PACKAGING MATERIAL HAVING EXCELLENT FLAVOR RETENTION

BACKGROUND OF THE INVENTION

(1) Field of the Invention

This invention relates to an improvement in the flavor retention of a packaging material comprising a thermoplastic polyester, and more specifically, an improvement of a polyester-type packaging material by suppressing the dissolving out of a specific flavor-damaging component.

(2) Description of the Prior Art

A thermoplastic polyester such as polyethylene terephthalate (PET) has excellent mechanical properties, shock resistance, heat resistance and transparency, and alone or in combination with another heat-sealing resin, is used widely as such utilities such as a two-piece can or a can closure in the form of a laminated material with a metal substrate as a stretch-blown molded container or a film container.

Japanese Laid-Open Patent Publication No. 339348/1993 describes a polyester film composed of a copolyester having a melting point of 210° to 245° C., a glass transition temperature of at least 50° C. and a terminal carboxyl group content of at least 35 equivalents/$10^6$ g as a polyester film for a metal plate-adhering molding processing which can produce a metal can having excellent heat resistance, retorting property and flavor retention.

Japanese Laid-Open Patent Publication No. 116376/1994 describes a copolyester and a film containing 0.05 to 20% by weight of a polyoxyalkylene-glycol component, 1.0 to 500 ppm of germanium element and 1.0 to 50 ppm of an alkali metal element as a copolyester and a film for metal plate-adhering having excellent flavor retention, heat resistance and shock resistance.

The thermoplastic polyesters have a considerably lesser tendency to adsorb a flavor component of the contents than other thermoplastic resins such as polyethylene or polypropylene and yet they have unneglible tendency of adsorption as compared with inert materials such as glass. The tendency of adsorbing a flavor component in the contents is attempted to decrease by adjusting the terminal carboxyl concentration of the copolyester to at least a certain fixed value in the first-mentioned proposal and by adding a certain amount of the alkali metal component in the latter-mentioned proposal.

However, the investigations of the present inventors showed that the decrease of the flavor retention in a packaging material composed of a thermoplastic polyester is due to the adsorption of a flavor component in the above-mentioned contents but is also greatly affected by the dissolving out of the flavor-damaging component in the thermoplastic polyester into the contents.

SUMMARY OF THE INVENTION

The present inventors have monitored that the flavor-damaging component in the thermoplastic polyester is prepared by the copresence of a dibasic carboxylic acid or its oligomer and an alkali metal, and by adjusting the content of the dicarboxylic acid and its oligomer to 500 ppm or below, the content of the alkali metal to 30 ppm or below and the content of sodium to 6 ppm or below, the flavor retention of a packaging material composed of the thermoplastic polyester can be successfully increased.

It is an object of this invention to provide a packaging material composed of a thermoplastic polyester having markedly increased flavor retention.

Another object of this invention is to provide a packaging material in which the dissolving out of a flavor-damaging component in the contents is extremely suppressed, which material is composed of a laminated material consisting of a substrate composed of a metal foil or metal plate and a thermoplastic polyester film inner material applied to its surface.

According to this invention, a packaging material composed of a thermoplastic polyester as a constituent element or a packaging material composed of a laminated material consisting of a substrate composed of a metal foil or a metal plate and a thermoplastic polyester film inner surface material applied to its surface, said packaging material having excellent flavor retention, wherein the content of a dibasic carboxylic acid or its oligomer derived from the polyester in the above-mentioned thermoplastic polyester is 500 ppm or below, the content of the alkali metal is 30 ppm or below, and the content of sodium is 6 ppm or below.

In a packaging material consisting of a substrate of a metal foil or a metal plate and the substrate covered with a thermoplastic polyester-film inner surface, a lubricant (an antiblocking agent) is compounded in order to increase the handling operability of a drawn film. The compounding of this lubricant makes the dissolving tendency of the flavor damaging component more marked. In the present invention, flavor retention is markedly increased in this use.

DETAILED DESCRIPTION OF THE INVENTION

The present invention is based on the new finding that the flavor-damaging component of the thermoplastic polyester is formed in the copresence of the dibasic carboxylic acid or its oligomer and an alkali metal, especially sodium. The flavor retentivity of the packaging material can be markedly increased by adjusting the content of the dibasic carboxylic acid or its oligomer to 500 ppm or below, especially 400 ppm or below, and as regards alkali metals, adjusting the content of sodium to 6 ppm or below, and the content of the alkali metals on the whole to 30 ppm or below, especially 20 ppm or below.

Figure 1:
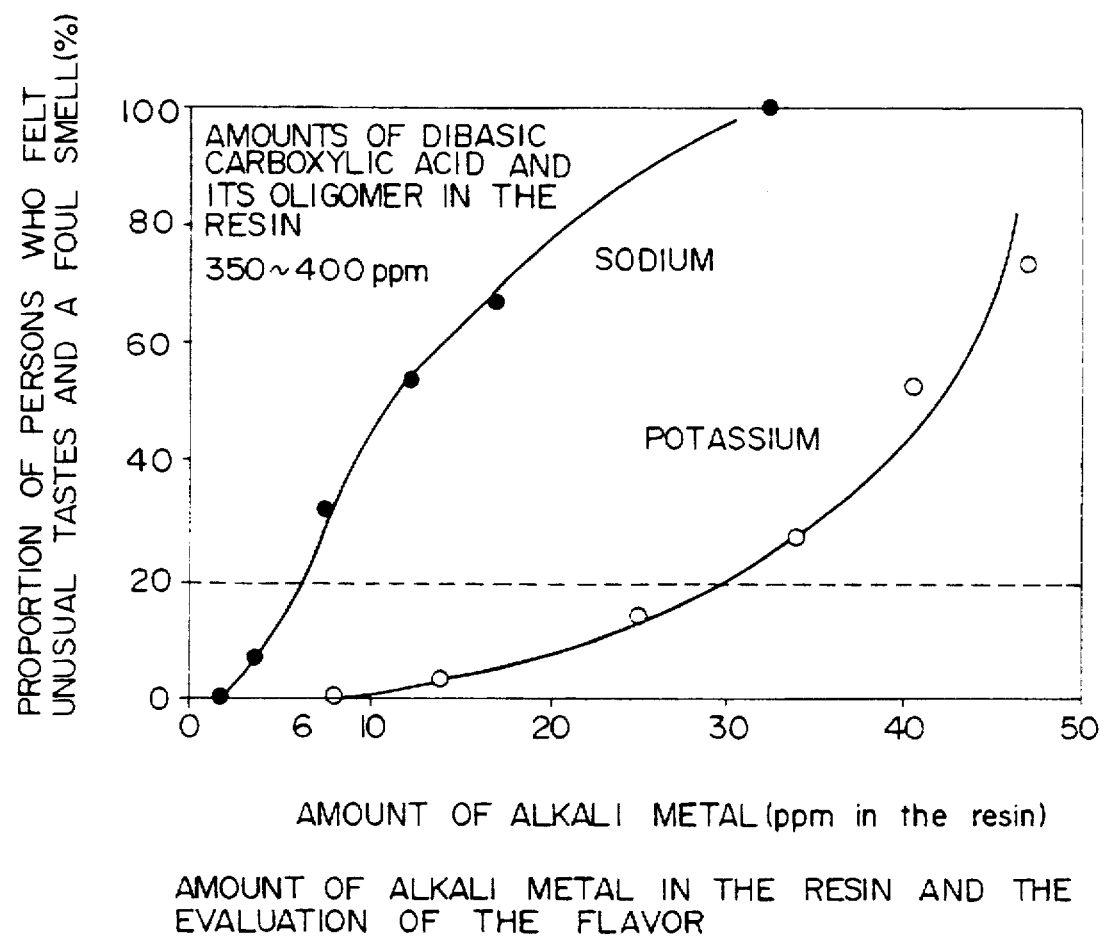
FIG. 1 is a graph plotting the evaluation of a functional test on the axis of ordinates while the axis of abscissas represents the content of alkali metal in the thermoplastic polyester and FIG. 2 is a graph plotting the evaluation of a functional test, while the axis of abscissa represents the content of the dibasic acid or its oligomer in the thermoplastic polyester.
Figure 2:
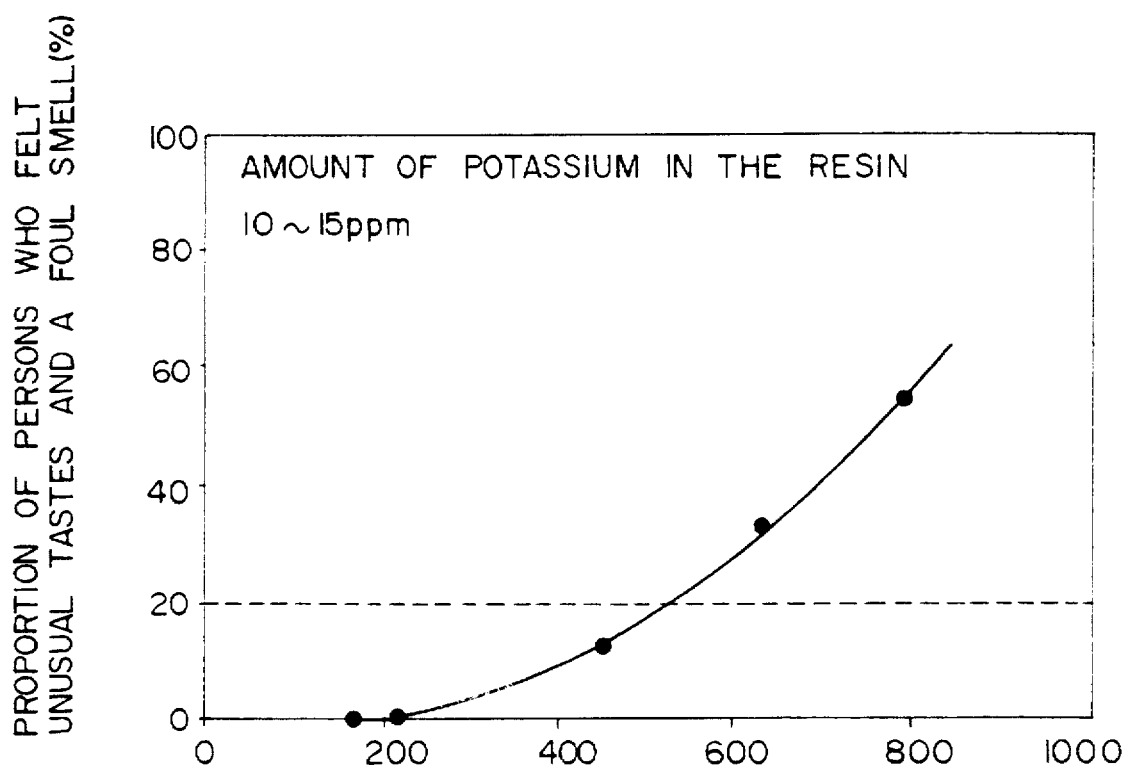

Reference may be made to FIGS. 1 and 2 and Examples shown below. FIG. 1 is a graph showing the content of the alkali metal in the thermoplastic polyester on the axis of abscissa, and the evaluation of a functional test shown on the axis of ordinate. A container having the thermoplastic polyester as an inner material is filled with distilled water and retorted to make it germ-free. By using 50 panelists, the container is evaluated by a functional test. It was judged that when the proportion of panelists who detected an unusual taste and an unusual odor exceeded 20%, the packaging material had an inferior flavor retention, and when the proportion of panelists who detected an unusual taste and an unusual odor was 20% or below, the packaging material had excellent flavor retention. The contents of the dibasic carboxylic acid or its oligomer of these polyesters were in the range of 350 to 400 ppm.

These results show that when the content of sodium salt among alkali metal salts is 6 ppm or below and the content of potassium is 30 ppm or below, especially 20 ppm, the proportion of persons who felt an unusual taste and an unusual odor was 20% or below, and the contents of the container showed excellent flavor retention.

FIG. 2 shows the content of the dibasic carboxylic acid or its oligomer of the thermoplastic polyester on the axis of abscissa, and the evaluations of a functional test determined in the same way as in FIG. 1. These polyesters contain potassium as the alkali metal in an amount of 10 to 15 ppm. FIG. 2 showed that when the content of the oligomer is 500 ppm or below, the proportion of persons who felt an unusual taste and an unusual odor was 20% or below, and the container held excellent flavor retention.

As is already known, the thermoplastic polyester is formed by polycondensation of a dibasic carboxylic acid and a diol. This polyester contains another minute or small amount of a monomer or oligomer component inevitably. Alkali metal components such as sodium will be mixed into the polyesters at every opportunity, for example, from monomers used, catalysts used, various additives such as lubricants, dispersing agents and molecular weight adjusting agents, and various devices used for the production of polyesters and films.

The dibasic carboxylic acid or its oligomer and the alkali metal components may react with each other and can exist in the form of salts. Furthermore, the acid or oligomer component and a sodium component may exist as independent components. However, in a molding step of a film, or a molding step of a packaging material, the thermoplastic polyester is melted or kneaded. It is considered to have a tendency that the acid or oligomer component may be bonded to an alkali metal component such as sodium to form a salt.

Among the dibasic carboxylic acid or its oligomer, what will become a flavor-damaging component may be an oligomer represented by general formula (1) or (2)

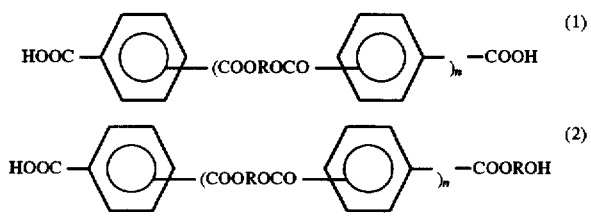

wherein n is 0, 1 or 2 and R represents —$CH_2CH_2$—, —$CH_2CH_2CH_2CH_2$— or —$CH_2CH_2OCH_2CH_2$—.

An oligomer at the terminal of the hydroxyl group, or a cyclic oligomer has a less tendency to damage the flavor. The above dibasic carboxylic acid or its oligomer, when converted to its alkali metal salt, especially its sodium salt, becomes a large solubility as compared with free acids (sodium isophthalate has a solubility 600 times as large as isophthalic acid, and sodium terephthalate has a solubility 1000 times as large as terephthalic acid). It is understood that an increase in flavor retention is effective by decreasing the content of the dibasic carboxylic acid or its oligomer and the content of the alkali metal because they are dissolved in the contents of the packaging material and damage their flavor.

In a packaging material composed of a metal foil or metal plate as a substrate and a thermoplastic polyester film inner material coated on the substrate, it is essential to compound a lubricant (anti-blocking agent) in order to prevent blocking of a stretched film or to compound a dispersing agent in order to better its dispersion. With respect to the compounding of these additives, the melting and kneading operation at the time of molding the film and the melt-adhering at the time of producing a laminated material, the dissolving out of a flavor-damaging component from the inner surface material gives a great influence, but by maintaining the content of the dibasic carboxylic acid or its oligomer and the content of the alkali metal within the above ranges in this invention, the flavor retention of the packaging material can be markedly increased.

DETAILED DESCRIPTION OF THE PREFERRED EMBODIMENTS

[Thermoplastic Polyester]

In a condition before filling of contents, the packaging material of this invention is composed of a thermoplastic polyester as a constituent material containing 500 ppm or below, especially 400 ppm or below, of the dibasic carboxylic acid or its oligomer, 30 ppm or below, especially preferably 20 ppm or below, of the alkali metals and 6 ppm or below of sodium.

The contents of the dibasic carboxylic acid or its oligomer and the alkali metal salts can be determined from extraction of a polyester solution and analysis of composition of the extracted components, as shown in Examples shown below.

In order to limit the contents of the dibasic acid or its oligomer and the alkali metals in the thermoplastic polyester to below the above-mentioned amounts, it is effective to (1) decrease the content of sodium or the content of the alkali metals contained in the entire molded article of the thermoplastic polyester in its entirety to as small amounts as possible, and (2) decrease the content of the dibasic carboxylic acid or its oligomer contained in the molded article of the thermoplastic polyester to as a small amount as possible.

As means (1), it is natural to use a monomer having a small contamination of an alkali metal component. The use of a polymerization catalyst and a polymerization adjusting agents containing the alkali metal components should be avoided. When an alkali metal component should be used by all means, alkali metal components other than sodium, such as a potassium metal component, should be used. When in stretching and film-formation, a lubricant (anti-blocking agent) or a dispersing agent or a dispersing aid for dispersing the lubricant in the resin is used, the use of an alkali metal component, especially sodium, should be avoided. Furthermore, a polymerization apparatus, a drying apparatus, an extruding apparatus, and a film-forming apparatus should be used those apparatuses not contaminated with alkali metal components. Preferably, the content of an alkali metal component in the polyester may be 30 ppm or less, and especially the content of sodium metal may be 6 ppm or less.

As the means (2), a thermoplastic polyester material having the smallest possible dibasic carboxylic acid or its oligomer should be used. A thermoplastic polyester having the small content of a dibasic carboxylic acid or its oligomer can be obtained generally under mild polymerization conditions, namely by polymerizing at a relatively low temperature for a long period of time, for example at a temperature of 150° to 280° C. for 2 to 20 hours. Furthermore, the thermoplastic polyester produced once may be subjected to solid-phase polymerization. It is preferred that the content of the dibasic carboxylic acid or its oligomer should be 500 ppm or below, or 400 ppm or below, based on the resin.

The thermoplastic polyester should be an ethylene terephthalate polyester, especially a polyester composed of at least 70% by weight of an ethylene terephthalate unit, especially at least 72% by weight of an ethylene terephthalate unit.

The thermoplastic polyester having a glass transition point (Tg) of 50° to 90° C., especially 55° to 80° C., and a melting point (Tm) of 200° to 275° C., or 220° to 270° C., is preferred.

Homo-polyethylene terephthalate is preferred in respect of heat resistance. A copolymerized polyester containing a small amount of an ester unit other than the ethylene terephthalate unit or a polyester blend composed mainly of polyethylene terephthalate may be used. For example, a small amount of polybutylene terephthalate or a liquid crystalline polyester may be blended.

Examples of dibasic acids other than terephthalic acid include one or blends of at least two of aromatic dicarboxylic acids such-as isophthalic acid, phthalic acid and naphthalenedicarboxylic acid; alicyclic dicarboxylic acids such as cyclohexanedicarboxylic acid; and aliphatic dicarboxylic acids such as succinic acid, adipic acid, sebacic acid and dodecanedioic acid. Examples of diol components other than ethylene glycol include one or combinations of at least two diols, for example, propylene glycol, 1,4-butandiol, diethylene glycol, 1,6-hexylene glycol, cyclohexane dimethanol and an ethylene oxide adduct of bisphenol A.

As a thermoplastic polyester to be used as a laminate with a metal substrate, there are suitably used copolymerized polyesters composed of terephthalic acid and isophthalic acid in a weight ratio of 100:0 to 70:30, especially in a weight ratio of 100:0 to 72:28. These copolyesters may contain another dibasic carboxylic acid or a diol component other than ethylene glycol as copolymer components within ranges in which they satisfy the above softening points and melting points.

The thermoplastic polyesters used should have at least a molecular weight sufficient to form a film, and depending upon their utility, an injection grade or extrusion grade of the polyester may be used. They may have an inherent viscosity (I. V.) of generally 0.6 to 1.4 dl/g, especially desirably 0.65 to 1.3 dl/g.

Of course, within the ranges satisfying the restrictions of this invention, polyesters in accordance with an ester interchange method, a direct polymerization method, and a solid phase polymerization method may be used. The thermoplastic polyesters are not limited to these polymers, and may include all polyesters which are polymerized from the above dibasic carboxylic acids and diols, for example, may include polyethylene naphthalate.

[Packaging Materials]

In a preferred embodiment of this invention, a thermoplastic polyester film is adhered to a metal foil or metal plate at least as an inner surface material, and this laminated material may be used as the packaging material.

It is important that the polyester film used in lamination should be biaxially stretched. The polyester film used is obtained by melt-extruding the aforesaid polyester, rapidly quenching and solidifying it to form an unstretched film, heating the unstretched film at a stretching temperature, stretching the unstretched film biaxially by using a tenter, and as required, heat-setting the stretched film. The degree of biaxial orientation may be ascertained by a polarization fluorometric method, a birefringence method or a density gradient tubular method. In the present invention, the polyester film should be desirably molecularly oriented so as to have a density of 1.345 g/cm$^3$ to 1.395 g/cm$^3$.

The thickness of the film may be 5 to 50 μm from a viewpoint of gas barrier property with respect to a corrosive component and processability.

In the present invention, the polyester film may be used in the form of a single layer, or in the form of multilayers of a laminated film. In the case of the latter laminated film, a film layer on a metallic plate side should have excellent heat adhesion, and on the surface side, the material should have excellent mechanical properties and an excellent barrier properties against a flavor-containing component and a corrosive component.

The stretched polyester film used for lamination generally contains an anti-blocking agent. Examples of the anti-blocking agent include those which contain 0.1% by weight or below of sodium, especially 0.05% by weight or below of sodium. If this condition is satisfied, there may be used inorganic anti-blocking agents such as silica-type, calcium carbonate-type, alumina-type, silica-alumina type, titanium-type, clay-type and zeolite-type anti-blocking agents; and organic anti-blocking agents such as crosslinked resin particles.

Preferred anti-blocking agents are spherical crosslinked silicon resin particles which are obtained by hydrolyzing monomethyltrialkoxysilanes.

Desirably, the particle diameter of the anti-blocking agent is in the range of 0.01 to 5 μm, preferably 0.1 to 2 μm. On the other hand, the amount of the anti-blocking agent to be compounded in the polyester should desirably be 0.01 to 10% by weight, especially 0.01 to 5% by weight.

In order to increase the adhesion of the film, it is generally desired to subject the surface of the biaxially stretched polyester film to a corona discharge treatment. The degree of the corona discharge treatment should desirably be such that the wet strength of the polyester film should be at least 44 dynes/cm.

Elsewhere, it is possible to perform a known adhesiveness increasing surface treatment such as a plasma treatment and a flaming treatment of the film, or an adhesiveness increasing coating treatment of a urethane-type resin or a modified polyester resin.

When the film and a metal material are directly heat-adhered, the metal material is pre-heated to a vicinity of the melting point of the polyester or above, this heated metal material and the film are laminated to press them with each other, and the entire materials are rapidly quenched to form a laminate. Furthermore, both may be heat-adhered by using an adhesive primer.

In the present invention, various surface-treated steel plates, or light metal plates such as aluminum, or foils of these metals may be used as the metal substrates.

The surface treated steel plates or foils may be obtained by annealing cold rolled steel plates, secondarily cold rolling them, and subjecting them to one surface treatment or at least two surface treatments such as zinc plating, tin plating, nickel plating, electrolytic chromic acid treatment and chromic acid treatment. At the surface and back of the plate, different platings or different surface treatments may be carried out. One preferred example of the surface treated plate is an electrolytic chromic acid treated steel sheet, especially having 10 to 200 mg/m$^2$ of a metal chromium layer and 1 to 50 mg/m$^2$ (calculated as a metallic chromium) of a chromium oxide layer. This surface treated plate has an excellent combination of the intimate adhesiveness of a coated layer or a film and a corrosion resistance. Another example of the surface treated steel sheet is a tin plate having a tin plated amount of 0.1 to 11.2 g/m$^2$. This tin plate is desirably subjected to a dichromic acid treatment, a chromic acid treatment, or a chromic acid/phosphoric acid treatment so that the amount of chromium becomes 1 to 30 mg/m$^2$ calculated as metallic chromium.

As the light metal plate or foil, a pure aluminum plate or foil and aluminum alloy plates or foils are used. An aluminum alloy plate having excellent corrosion resistance and processability has a composition composed of 0.0 to 1.5% by weight of Mn, 0.0 to 5% by weight of Mg, 0.01 to 0.3% by weight of Zn, 0.01 to 0.25% by weight of Cu, 0.01 to 0.25% by weight of Cr, and the remainder being Al. It is desirable to subject these light metal plates to a surface treatment from the standpoint of the intimate adhesiveness and corrosion resistance of a coated film or a film. These surface treatments include a chromium treatment, a zirconium treatment, a phosphoric acid treatment, an alumite treatment, an acrylic acid treatment, etc. Among these treatments, these light metal plates are desirably subjected to a chromic acid treatment or a chromic acid/phosphoric acid treatment so that the amount of chromium is 5 to 300 mg/m² calculated as metallic chromium.

The thickness of the metal substrate varies from 2 μm in the case of foils to 1 mm in the case of plates.

The adhesive primer used for the production of the laminated plate shows excellent adhesiveness to both of the metallic material and the polyester film. Typical examples of a primer paint having excellent intimate adhesiveness and corrosion resistance include phenol-epoxy type paints composed of a resol-type phenol-aldehyde resins derived from various phenols and formaldehyde and bis-phenol type epoxy resin, especially a paint composed of a phenol resin and an epoxy resin in a weight ratio of 50:50 to 5:95, especially 40:60 to 10:90. The adhesive primer layer may be provided generally in a thickness of 0.1 to 5 μm.

Heat-adhesion of the polyester film is preferably carried out at a temperature of 35° C. lower than the melting point of the polyester to 40° C. higher than the melting point of the polyester.

The surface temperature of the laminate roll is preferably maintained at a temperature 180° C. lower than the melting point of the polyester to 70° C. lower than the melting point of the polyester in order to hold molecular orientation of the surface.

The above-mentioned laminated material is used as an ordinary wrap seamed top and bottom can closure, an easily openable can or a material to be used as a welded seamed three-piece can. For example, the above laminated material may be processed by draw-forming, thickness-reduction draw-forming or draw-forming-ironing to form a can barrel for a two-piece can. In this case, the following conditions are preferably used.

First, draw-forming, thickness-reduction draw-forming or draw-ironing may be carried out at a proper stretching temperature of the polyester, especially at least the glass transition temperature and below the melting temperature of the polyester. Within this temperature range, the polyester plastically flows during molding and is effectively molecularly oriented axially. Especially by thickness reduction draw-forming with bending and elongation or by draw-forming and ironing, thickness reduction of the laminate material is effectively carried out.

The above processing is performed by using a punch and a die. The use of a punch having a side surface with an average roughness (Ra) of 0.01 to 3 μm, especially 0.1 to 2 μm, is preferred from the standpoint of escaping of a cup after processing. The pattern of roughness is generally a dot-like (dimple-like).

The seamless can made by using the material of this invention can be produced in a known method except that the aforesaid laminate material is used. This laminate is sheared in the form of a circle, and the circle is subjected to one step or a plurality of steps of a draw-forming processing between a drawing punch and a drawing die. In this draw-forming step, an upper portion of a side wall portion of the cup may be subjected to a light ironing processing, or to thickness reduction of the side surface by applying a tensile force to perform the thickness reduction of the side wall by elongation and stretching with the selection of the die radius of the draw-forming die in an axial direction. The details of thickness reduction by bending and stretching are described in Japanese Laid-Open Patent Publication No. 35004/1989 of the present inventors. In the case of a deep-drawn can, the draw-forming can be carried out in one step or a plurality of steps. The draw ratio $R_d$ defined by the following formula $$R_d = \frac{D}{d}$$

wherein D is the diameter of the laminate material and d is the diameter of the punch, may be 1.2 to 2.5 in the case of one step.

In the case of elongation and stretching, the degree of thickness reduction of the side wall portion of the can is effectively obtained so that it will become 5 to 45%, especially 5 to about 40%, of the thickness ($t_B$) of the elemental plate, that is to say, the residual ratio of thickness will become 55 to 96%, especially 60 to 95%. In addition to the above draw-forming processing, it is effective to add an ironing molding in order to carry out thickness reduction.

The ironing processing can be performed in one step or a plurality of steps. The ironing ratio ($R_1$) defined by the following formula may preferably be 5 to 40% in the case of ironing in one step.

$$R_1 = \frac{t_o - t_1}{t_o} \times 100$$

wherein $t^o$ is the thickness of the laminate material before the ironing processing, and $t_1$ is the thickness of the side wall portion of the cup after the ironing processing.

In the case of a plurality of ironing, the first ironing ratio is made as high as possible, and the final ironing ratio on the ring from the escaping of cup after processing may be preferably adjusted to 3 to 20%.

The draw-formed cup obtained by the above molding, as required, may be subjected to trimming, evaporation of a lubricant, and a step of printing on the outside surface, then necked and flanged to form a can by wrap seaming with a can closure.

The polyester film layer which becomes the inside surface of the can by the above-mentioned molding is molecularly oriented monoaxially or biaxially at least on its surface.

In accordance with another embodiment, the thermoplastic polyester is stretched draw blow molded and is used for the production of a packaging material in the form of a bottle. In this case, the thermoplastic polyester is first molded into a preform, and then is stretch blow molded into a bottle.

An injection molding is used to mold the polyester into a preform. Specifically, the polyester is melt-injected into an injection mold cooled, and the overcooled amorphous polyester was molded into a preform. In this injection molding, the injection molding should be carried out at the lowest possible temperature of the resin so that the content of a sodium salt of the dibasic carboxylic acid or its oligomer in the preform. Preferably, the injection molding should be carried out at 310° C. or below, especially 270° to 300° C.

The injection molding machine usable in this invention may include known machines equipped with an injection plunger or a screw. The polyester is injected into an injection mold through a nozzle, a spruce and a gate. This causes the polyester to flow into an injection molding cavity, and to be solidified to a preform for stretch blow molding.

The injection mold used may include a cavity corresponding to the shape of a container and an air vent at a portion corresponding to the mouth portion of the preform. It is preferred to use an injection mold of the one gate-type or the multigate-type.

The injection pressure is preferably about 28 to 110 kg/cm$^2$.

Then, the polyester preform is stretched and blow molded to mold a bottle having a neck portion, a barrel portion and a bottom portion.

For the stretch blow molding from the preform, a method of carrying out stretch blow molding following the molding of the preform can be used by utilizing the heat given to a preform molded article that is molded, namely remaining heat. Generally, it is preferred to produce a preformed molded article in an overcooled state, heat this preform to the above-mentioned stretching temperature, and perform stretch blow molding the preform.

The suitable stretching temperature of the preform is generally 85° to 135° C., especially 90° to 130° C. The heating may be carried out by using a known means such as an infrared ray heating, a hot air heating furnace and a dielectric heating.

In carrying out stretch blow molding, the preform at a stretching temperature is pulled axially and stretched by a stretching rod with or without a blow mold and expanded and stretched peripherally by the blowing of a fluid. The stretching factor may be 2 to 3.6 times, especially 2.2 to 3 times, in an axial direction and 3 to 6.6 times, especially 3.5 to 6 times, in a peripheral direction. The axial stretching factor is determined by the the length of the preformed molded article in an axial direction and the stroke length of the stretching rod. The stretching factor in a peripheral direction can be determined by the relation between the diameter of the preform and the diameter of the cavity of the mold, and in the case of free blow, it is determined by the blowing pressure of the fluid.

The present invention can be equally applied to the production of an ordinary bottle, a pressure-resistant bottle, a heat-resistant bottle, and a heat and pressure-resistant bottle. In the case of the heat-resistant bottle, in order to absorb the reduced pressure after hot filling the contents, a reduced pressure absorbing mechanism such as a rib portion and a panel portion is provided in the barrel portion of the container so that the reduced pressure may be absorbed by paneling deformation of the panel portion to the inside of the container. In the heat-resistant bottle, the wall of the container is heat-set in order to prevent heat deformation of the wall of the container during heating. On the other hand, contents having an autogenous pressure such as a carbonated drink are filled and then pasteurized by means of a pasteurizer. In order to prevent creep deformation of the bottom portion under heat and pressure at the time of pasteurization, it may be possible to heat-crystallize an unstretched portion or a lowly stretched portion, or stretch the bottom portion in the same way as in the barrel portion to orient and crystallize the bottom portion.

Heat-setting of the bottle is carried out by various means. For example, a blow molding mold is heated, or further a high temperature fluid is blown into the bottle, and heat-setting may be carried out simultaneously with stretch blow molding. Furthermore, by using a heat-setting mold in addition to the blow molding mold, the bottle obtained by blow molding is put into the heat-setting mold that is heated, heat-setting may be performed while blowing. Furthermore, the bottle blow molded is removed out of the blow molding mold, heat-set in a state in which free shrinkage is possible, then the heat-set bottle is put into a secondary blow molding mold, and is subject it again to blow molding to produce the final blow molded container.

Heat-setting of the wall of the container is suitably carried out by heating it at a temperature of generally 120° to 220° C., especially 130° to 210° C. The mold may be heated with electrical heating, or the bottle may be heated with a direct infrared ray.

In the polyester bottle of the polyester in accordance with the present invention, the thickness of the barrel portion of the container may differ depending upon the volume or utility of the bottle. Generally, it is preferably generally 200 to 500 μm, especially 25 to 450μ. On the other hand, the basis weight is preferably 25 to 45 g/liter, especially 30 to 40 g/liter.

The present invention has been described with respect to a two-piece can composed of a metal/polyester film laminated material and a biaxially stretched bottle. Beside these materials, the present invention is also useful as cup-like containers by using such means as vacuum forming, pressure molding and plug assist molding.

EXAMPLES

The present invention will be illustrated by the following examples.

(1) A method of quantifying a dicarboxylic acid or its oligomer in the polyester When the form of the sample is a film or a bottle, the sample is made into minute pieces. The chips are directly used. In the form of a laminated body composed of a metal foil and a metallic plate, the polyester is peeled from the metal by using dilute hydrochloric acid and the remainder is made into a fine piece.

The polyester (0.5 g) was completely dissolved in 5 ml of a mixture of hexafluoroisopropanol and chloroform (50/50), and diluted with 20 ml of chloroform. The solution was poured into 150 ml of methanol to precipitate the polymer. The extract was filtered, the filtrate was combined with the washing liquid of the flask and the polymer, and concentrated to give several milliliters with an evaporator. This concentrated solution was treated with acetonitrile to give 10 ml of a fixed volume and make an assay solution.

The assay solution was measured by a high speed liquid chromatographic apparatus using an inverted layer column, and further measured by a UV detector to give an absorption at 230 nm. A peak of the resulting chromato-graph was identified with a mass spectrum and an infrared spectrum. Peak areas of peaks appearing at the elution positions of the dibasic carboxylic acid and its oligomer were totaled, and their weights were determined by calculation of MHET (monohydroxyethylterephthalic acid).

The amount of the oligomer derived from isophthalic acid and the amount of the oligomer derived from terephthalic acid were measured by picking up the peaks derived from the dibasic carboxylic acid or its oligomer obtained by measuring of the assay solution under the above conditions by the liquid chromatography, removing the solvents, then measuring the infrared spectrum, and determining the ratio of absorbance of 1300 cm$^{-1}$ to absorbance of 1240 cm$^{-1}$. Using a cast film prepared from a mixture of polyethylene terephthalate and poly ethylene isophthalate in various ratios, the correlation of absorbance ratios mentioned above and the ratio between isophthalic acid and terephthalic acid is calculated, and from the calibration curve prepared, the composition ratio of the acids of the picked up product of the assay solution was measured. By a proportional calculation, the amounts of oligomers derived from the individual acids were calculated.

(2) A method of measuring the amounts of alkali metals in the polyester

A polyester sample (0.5 g) was weighed into a platinum crucible, dissolved completely in 5 ml of orthochlorophenol, and the alkali metals were extracted with 0.5N, dilute hydrochloric acid. Using 20 ml as a fixed content, the alkali metals were measured by an atomic absorption analyzing method.

(3) A method of measuring the contents of alkali metals in the anti-blocking agent Alkali metals in the anti-blocking agent in silicic acid were weighed in a crucible in an amount of 0.5 g. Hydrofluoric acid and perchloric acid were added and the mixture was heated to evaporate the acids. The residue was dissolved in 0.5N dilute hydrochloric acid and the amounts of alkali metals were measured by an atomic absorption method. When the sample had organic components, a small amount of sulfuric acid was added to make an ash, and thereafter, the above treatment was performed to make a measurement.

(4) A flavor evaluation test

The intended container was filled with distilled water, and the container was subjected to a germ-killing treatment. Then, the container was preserved for three months at 20° C. Thirty males and 20 females in the twenties to forties were employed as a panel who had a high sensitivity to flavors in a five taste distinguishing test (sweet taste, hot taste, acid taste, bitter taste palatable taste; it is deemed to be passable that the erroneous number among the five tastes is 1 or less). The flavor of the liquid contents preserved was compared with distilled water, and the percentage of persons who felt unusual tastes and a foul smell was computed. If the number of persons who felt unusual tastes and an offensive smell was 20% or less, it was judged that there was no significance.

Examples 1–5 and Comparative Examples 1–5

Sodium hydroxide, potassium acetate and lithium acetate were added in varying amounts to a polyester starting material composed of terephthalic acid (88 mol % of the acid component), isophthalic acid (12 mol % of the acid component) and ethylene glycol to prepare 10 kinds of copolymerized polyesters having varying amounts of alkali metals. Each polyester was melt-extruded at 280° C., rapidly quenched and solidified to form an unstretched film. This unstretched film was stretched longitudinally at 120° C. to 3.0 times and stretched laterally to 3.1 times, and heat-treated at 180° C. to form a biaxially stretched film having a thickness of 25 μm.

Thereafter, the above biaxially stretched film was hot-laminated on both surfaces of a tin-free steel (TFS) sheet having a thickness of 0.175 mm and a tempering degree of DR-9 while maintaining the temperature of the sheet at 240° C., the temperature of a laminate roll at 150° C., the speed of passing of the sheet at 40 m/min. The laminated sheet was immediately quenched with water to obtain a laminated metal sheet. This coated metal sheet was coated with vaseline, and punched into a circular plate having a diameter of 179 mm to obtain a shallow-drawn cup. The drawing ratio in the drawing step was 1.56. Then, this cup was subjected to a primary and a secondary thickness reduction and re-draw forming steps. The primary re-draw forming ratio was 1.37, and the secondary re-draw forming ratio was 1.27.

The resulting deep drawn cup had the following properties.

| | |
|---|---|
| Diameter of the cup | 66 mm |
| Height of the cup | 128 mm |
| Variation of the thickness of the side wall | −20% (based on the elemental plate thickness) |

This deep drawn cup was domed in accordance with a customary manner, heat-treated at 215° C., allowed to cool, and subjected to trimming at the edge portion of the opening mouth, curved surface printing, hardening, drying and flanging to form a 350 g two-piece can. The amounts of the dibasic carboxylic acid or its oligomer in the film inside the can and the amounts of alkali metals were measured, and the results are shown in Table 1.

Distilled water was filled in the can, retorted for 2 hours at 121° C., and preserved at 20° C. for three months. After preservation, the content liquid was subjected to the flavor test, and the results are shown in Table 1.

It was found that the amount of the dibasic carboxylic acid or its oligomer was 600 ppm or less, the content of sodium as the alkali metal was 6 ppm or less, the total amounts of the other alkali metals were 30 ppm or less, and the flavor test showed good results, thus the flavor retention was excellent.

Example 6 and Comparative Example 6

Sodium hydroxide was added to the same material as described in Example 1. After the preparation of the copolymerized polyester, a part of the resulting resin was taken out and further subjected to solid phase polymerization at 215° C. for 20 hours under a nitrogen atmosphere to form a chip. From the resin obtained by solid phase polymerization (Exa.6) and the resin obtained by only melt polymerization (Comp. Exa. 6), an unstretched film having a thickness of 25 μm was prepared. The film (1.0 g) was put into a quartz container, dipped in 500 ml of distilled water, retorted as in Example 1, and after a lapse of time, the flavor test was carried out. The amounts of the dibasic carboxylic acid or its oligomer, and the amounts of alkali metals in these films, and the results of the flavor test are shown in Table 1.

When the amount of the dibasic carboxylic acid or its oligomer was 500 ppm or less, the results of the flavor test were good.

Examples 7–9 and Comparative Examples 7–9

Alkali metals were added to terephthalic acid and ethylene glycol, and the mixture was subjected to solid phase polymerization in the same way as in Example 6 to prepare six types of polyester chips. Using each of these polyester chips, a preform was molded by injection molding, and thereafter, 1-liter heat-resistant PET bottle was prepared by stretch blow molding. Distilled water was filled into the above PET bottle, subjected to germ-killing treatment at 85° C. for 30 minutes. After preservation at 20° C. for three months, the container was subjected to a flavor test.

The amounts of the dibasic carboxylic acid or its oligomer and the alkali metals in the bottle resin and the evaluation of the flavor test were shown in Table 1.

In the PET bottle, when the alkali metal is sodium, the amount of alkali metal is 6 ppm or below, and the total amounts of other alkali metals are 30 ppm or below. When the amount of the dibasic carboxylic acid or its oligomer was 500 ppm or below, the results of the flavor test were good.

Example 10

Sodium hydroxide was added to terephthalic acid (80 mol % of the acid component), isophthalic acid (20 mol % of the acid component), and ethylene-glycol and in the same way as in Example 6 a copolymerized polyester was prepared. Thereafter, an unstretched film having a thickness of 25 μm was prepared. This film (1.0 g) was put into a quartz container, dipped in distilled water (500 ml), retorted and after a lapse of three months at 20° C., the container was subjected to a flavor test. The content of this film, the proportions of oligomers derived from terephthalic acid and isophthalic acid, and the results of the flavor test were shown in Table 2.

When the sodium content was 6 ppm or less and the amount of isophthalic acid or its oligomer was 200 ppm or less, the flavor retention was excellent.

Comparative Example 10

An unstretched film was prepared in the same way as in Example 10 except that terephthalic acid (60 mol % of the acid component) and isophthalic acid (40 mole % of the acid component) were compounded. The contents of sodium, and oligomers derived from terephthalic acid and isophthalic acid in the above film, and the results of the flavor test are shown in Table 2.

When the contents of isophthalic acid and its oligomer exceeded 200 ppm, the flavor retention was inferior even if the content of sodium is 6 ppm or less.

Example 11 and Comparative Examples 11 and 12

The anti-blocking agents having different alkali metal contents described in Table 3 were added in the proportions described in Table 4 to the starting material shown in Example 1 excepting alkali metals, and the mixture was biaxially stretched as in Example 1 to form a biaxially stretched film. A can was prepared and subjected to a flavor test. The contents of the dibasic carboxylic acid and its oligomer, and of the alkali metals and the evaluation of the flavor test are shown in Table 4.

These results show that when an anti-blocking agent having 0.1% by weight or less of sodium is used, a container having excellent flavor retention can be prepared.

TABLE 1

| | Contents of alkali metals (ppm) | | | Oligomer content | Proportion of persons who felt unusual tastes and a foul smell |
|---|---|---|---|---|---|
| | Na | K | Li | (ppm) | (%) |
| Example | | | | | |
| 1 | 3 | 0 | 0 | 340 | 8 |
| 2 | 1 | 9 | 0 | 365 | 2 |
| 3 | 1 | 0 | 12 | 380 | 4 |
| 4 | 2 | 3 | 5 | 355 | 6 |
| 5 | 0 | 9 | 8 | 350 | 6 |
| 6 | 4 | 0 | 0 | 290 | 10 |
| 7 | 2 | 0 | 0 | 260 | 0 |
| 8 | 1 | 9 | 3 | 255 | 2 |
| 9 | 1 | 10 | 13 | 250 | 14 |
| Comp. Ex. | | | | | |
| 1 | 12 | 0 | 0 | 350 | 46 |
| 2 | 1 | 35 | 0 | 420 | 30 |
| 3 | 2 | 0 | 45 | 430 | 66 |
| 4 | 4 | 15 | 20 | 390 | 84 |
| 5 | 2 | 18 | 31 | 380 | 94 |
| 6 | 4 | 0 | 0 | 630 | 38 |
| 7 | 15 | 0 | 0 | 380 | 60 |
| 8 | 2 | 40 | 0 | 290 | 62 |
| 9 | 1 | 15 | 23 | 310 | 40 |

TABLE 2

| | Na content (ppm) | Oligomer content (ppm) | | Proportion of persons who felt unusual tastes and a foul smell (%) |
|---|---|---|---|---|
| | | derived from TA* | derived from IA* | |
| Ex. 10 | 4 | 240 | 150 | 12 |
| Comp. Ex. 10 | 4 | 160 | 280 | 46 |

TABLE 3

| Anti-blocking agent | Na content (%) | K content (%) | Li content (%) |
|---|---|---|---|
| A | 0.002 | 0.001 | 0 |
| B | 0.25 | 0.01 | 0 |
| C | 6.3 | 2.0 | 0.001 |

TABLE 4

|  | Anti-blocking agent and its compounding amount | Na concentration (ppm) | K concentration (ppm) | Li concentration (ppm) | Oligomer concentration (ppm) | Proportion of persons who felt unusual tastes and a foul smell (%) |
|---|---|---|---|---|---|---|
| Example 11 | A 1.0% | 1 | 0 | 0 | 350 | 0 |
| Comparative Example 11 | B 1.0% | 27 | 6 | 0 | 370 | 92 |
| Comparative Example 12 | C 0.1% | 62 | 20 | 0 | 385 | 100 |

What is claimed is:

1. A packaging material composed of a biaxially stretched thermoplastic polyester wherein said polyester has (A) a total content of a dibasic carboxylic acid and its oligomer having a carboxylic group in an amount of 500 ppm by weight or less, and (B) a total content of alkali metal ions in an amount of 30 ppm by weight or less, wherein a content of sodium ions in the total content of alkali metal ions is an amount of 6 ppm by weight or less, to effectively eliminate damage to packaging ingredients caused by the dissolution of said dibasic carboxylic acid and its oligomer, said dibasic carboxylic acid and its oligomer being represented by the formulae (1) or (2)

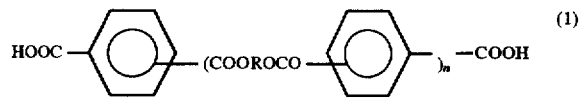

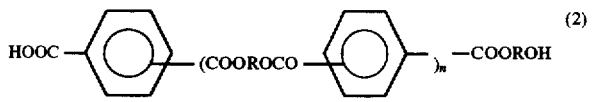

wherein n is 0, 1 or 2 and R represents —$CH_2CH_2$—, —$CH_2CH_2CH_2CH_2$— or —$CH_2CH_2OCH_2CH_2$—.

2. The packaging material of claim 1 wherein the dibasic carboxylic acid and its oligomer are terephthalic acid and its dimer, and wherein the terephthalic acid and its dimer are present in an amount of 400 ppm by weight or less.

3. The packaging material of claim 1 wherein the dibasic carboxylic acid and its oligomer are isophthalic acid and its dimer, wherein said isophthalic acid and its dimer are present in an amount of 200 ppm by weight or less.

4. The packaging material of claim 1 wherein said polyester comprises polyethylene terephthalate or an ethylene terephthalate/isophthalate copolyester.

5. The packaging material of claim 1 wherein said polyester comprises terephthalic acid and isophthalic acid present in a weight ratio of terephthalic acid to isophthalic acid of from 100:0 to 72:28.

6. The packaging material of claim 1 wherein said polyester has a glass transition point (Tg) of 50° to 90° C. and a melting point (Tm) of 200° to 275° C.

7. A packaging material comprising (i) a substrate of a metal foil or a metal plate, and (ii) a biaxially stretched thermoplastic polyester film applied to at least one surface of said substrate, wherein said polyester film has (A) a total content of a dibasic carboxylic acid and its oligomer having a carboxylic group in an amount of 500 ppm by weight or less, and (B) a total content of alkali metal ions in an amount of 30 ppm by weight or less, wherein a content of sodium ions in the total content of alkali metal ions is an amount of 6 ppm by weight or less, to effectively eliminate damage to packaging ingredients caused by the dissolution of said dibasic carboxylic acid and its oligomer, said dibasic carboxylic acid and its oligomer being represented by the formulae (1) or (2)

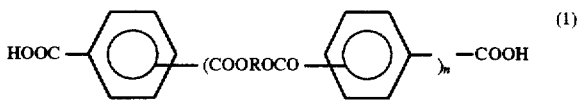

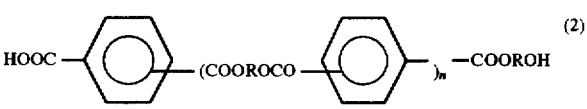

wherein n is 0, 1 or 2 and R represents —$CH_2CH_2$—, —$CH_2CH_2CH_2CH_2$— or —$CH_2CH_2OCH_2CH_2$—.

8. A packaging material comprising (i) a substrate of a metal foil or a metal plate, and (ii) a biaxially stretched thermoplastic polyester film applied to at least one surface of said substrate, said polyester film comprising 0.01 to 10% by weight of an anti-blocking agent containing 0.1% by weight or less of sodium ion, wherein said polyester film has (A) a total content of a dibasic carboxylic acid and its oligomer having a carboxylic group in an amount of 500 ppm by weight or less, and (B) a total content of alkali metal ions in an amount of 30 ppm by weight or less, wherein a content of sodium ions in the total content of alkali metal ions is an amount of 6 ppm by weight or less, to effectively eliminate damage to packaging ingredients caused by the dissolution of said dibasic carboxylic acid and its oligomer, said dibasic carboxylic acid and its oligomer being represented by the formulae (1) or (2)

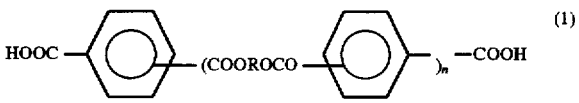

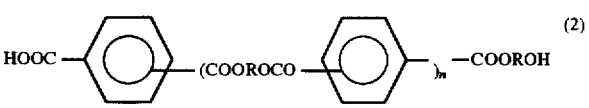

wherein n is 0, 1 or 2 and R represents —$CH_2CH_2$—, —$CH_2CH_2CH_2CH_2$— or —$CH_2CH_2OCH_2CH_2$—.

9. The packaging material of claim 8 wherein said anti-blocking agent has a particle diameter of 0.01 to 5 μm.

10. The packaging material of claim 8 wherein said anti-blocking agent is a spherical crosslinked silicon resin particle obtained by hydrolyzing monomethyltrialkoxysilane.

* * * * *